United States Patent [19]

Hong et al.

[11] Patent Number: 4,935,651
[45] Date of Patent: Jun. 19, 1990

[54] AUTOMATICALLY CONTROLLED DYNAMIC ABSORBER

[75] Inventors: Doo P. Hong, Ulsan; Yoon S. Ryu, Busan, both of Rep. of Korea

[73] Assignee: Hyundai Heavy Industries Co., Ltd., Ulsan, Rep. of Korea

[21] Appl. No.: 278,513

[22] Filed: Dec. 1, 1988

[30] Foreign Application Priority Data

| Dec. 4, 1987 | [JP] | Japan | 62-21424 |
| Dec. 4, 1987 | [JP] | Japan | 62-21425 |
| Dec. 4, 1987 | [JP] | Japan | 62-21426 |
| Dec. 30, 1987 | [JP] | Japan | 62-23750 |
| Dec. 30, 1987 | [JP] | Japan | 62-23752 |

[51] Int. Cl.$^5$ .................. H02K 5/24; F16F 17/10
[52] U.S. Cl. .................. 310/51; 74/573 R; 188/380; 267/141.2
[58] Field of Search .................. 188/378, 379, 380; 267/136, 141.2; 74/573 R; 310/51, 49; 318/114, 629

[56] References Cited

U.S. PATENT DOCUMENTS

| 4,458,554 | 7/1984 | Hraster | 74/573 R |
| 4,543,463 | 9/1985 | Scuricini | 74/573 R |
| 4,710,656 | 12/1987 | Studer | 310/51 |
| 4,724,923 | 2/1988 | Waterman | 188/380 |
| 4,796,873 | 1/1989 | Schubert | 267/136 |
| 4,848,525 | 7/1989 | Jacot et al. | 267/136 |
| 4,858,459 | 8/1989 | Takahashi | 188/380 |

*Primary Examiner*—Patrick R. Salce
*Assistant Examiner*—D. L. Rebsch
*Attorney, Agent, or Firm*—Finnegan, Henderson, Farabow, Garrett & Dunner

[57] ABSTRACT

An automatically controlled dynamic vibration absorber in which the characteristic frequency of the vibration absorber is adjusted automatically to the frequency of vibration from a vibrating source to dissipate the vibration by mating a response vibration with a forced vibration.

2 Claims, 13 Drawing Sheets

AUTOMATICALLY CONTROLLED DYNAMIC ABSORBER

FIELD OF THE INVENTION

The present invention relates to an automatically controlled dynamic absorber which is capable of absorbing vibrations by self-adapting to varying frequencies of external forces.

BACKGROUND OF THE INVENTION

Vibration absorbers of the prior art are not effectively applicable and adaptable to different vibrating frequencies, require severe power loss, and do not provide a good result. Further, they require auxiliary power consumption, and high manufacturing costs. Moreover, they are applicable only to a limited type of vibrating mass.

Generally, a structure having an internal combustion engine or an electric motor attached thereto has a vibration problem because the structure itself produces an acceleration of vibration. There are various approaches to solve the vibration problem including: reducing the acceleration of vibration itself; reinforcing the structure to withstand the vibration; isolating the structure from the vibration; and the like. However, all such approaches cost excessively, and their applicabilities are very limited.

For example, in a more complex structure such as a large ship having a large engine, the vibration problem can be very serious. A usual approach to solve the problem in such a case is to reinforce the particular portion of the structure, and the rigidity of the engine base. However, such an approach does not provide an effective solution, because, in part, even in the case where the rotational speed of the engine is constant, generating a constant acceleration of vibration, and the problem can be relatively easily solved, an auxiliary system with the characteristic frequency equal to the frequency of an external force has to be attached to the structure for generating an artificial resonance so that a vibration absorber is effectively provided to the structure to reduce a vibration response of the structure.

However, even in this case, the vibration absorbing effect of the vibration absorber can be obtained only at the characteristic frequency of the vibration absorber itself (that is, only when the frequency of the external force corresponds to the characteristic frequency of the vibration absorber). Therefore, such a vibration absorber is not adaptable in cases where the acceleration of vibration is varied as in complex structures such as ships, automobiles, variable electric motors, and the like. Therefore, the vibration problem in complex structures such as ships and the like is solved by installing within the structure a vibration generator, otherwise called vibration balancer, for generating a reverse vibration motive force which offsets a main vibration motive force. But this approach requires a high cost, large space, and high energy consumption for operating a reverse vibration generator.

SUMMARY OF THE INVENTION

The present invention is intended to overcome the difficulties of the devices of the prior art.

It is the object of the present invention to provide a variable dynamic vibration absorber which is adaptable to make its characteristic frequency correspond to varying frequencies of an external force.

The operating principle of this variable dynamic vibration absorber is that the frequency of a main vibration corresponding to the external force is mated with the characteristic frequency of the variable dynamic absorber, thus forming an opposition of resonance to dissipate or absorb energies from the main vibration and variable dynamic absorber. In other words, the frequency of vibration from the main vibration source such as an internal combustion engine or an electric motor is measured, and a spring or mass of the variable dynamic vibration absorber is adjusted in response to the measured frequency, so that the characteristic frequency of the variable dynamic absorber corresponds to the frequency of vibration from the main vibration source or an external force, thereby generating a vibration absorbing effect and reducing vibration response.

According to the present invention, when a mass system composed of a simple spring is attached to vibrating object and the characteristics frequency of the mass system equal to the frequency of an external force, a vibration absorbing effect can be realized. When the frequency of the external force is varied, the varied frequency is detected. Based on this detection, the characteristic frequency of the spring or the mass system is controlled to correspond to the varied frequency of the external force. Thus, the automatically controlled dynamic absorber (variable dynamic absorber) of the present invention provides a vibration-absorbing effect continuously within a range of varying frequencies of an external force.

The device according to the present invention is adaptable to any kind of vibrating mass. Further, the device of the present invention is practical for being capable of arbitrarily adjusting the extent of control, and economic for low manufacturing cost and low power consumption.

BRIEF DESCRIPTION OF THE DRAWINGS

The above object and other advances of the present invention will become more apparent by describing the preferred embodiments of the present invention with reference to the attached drawings in which.

DESCRIPTION OF THE PREFERRED EMBODIMENTS

Different embodiments of the present invention will now be described.

EMBODIMENT 1

When a shaft is rotated, torsional vibrations are generated to the shaft. This problem has been solved formerly by attaching a torsional damper which is very expensive.

In Embodiment 1 of the present invention, a variable dynamic vibration absorber is fixedly attached to a shaft, in that the absorber rotates at a same speed as the shaft. The variation absorber includes a pair of masses, each disposed facing the other. Each mass is supported upon a cantilever by a guide spring and a centrifugal force. Since the guide spring provides an elastic force equivalent to the centrifugal force, the mass becomes a vibrating body on the cantilever.

When the characteristic frequency of the cantilever and the mass is adjusted to correspond to the frequency of an external torsional force, a vibration absorbing effect is obtained. Therefore, there is formed in effect a rotation unit which is fixedly attached to the shaft to rotate together with the shaft. The mass has inner and outer sides in that the outer side is supported oscillatably by the cantilever, and the inner side is suspended oscillatably by guide springs.

In Embodiment 1, when the shaft is rotated, the masses are pushed outwardly due to the centrifugal force, and the masses are stopped at a position where the elastic force provided by the guide springs becomes equal to the centrifugal force. When the guide springs reach an equilibrium, the frequency of the vibration absorber having the masses suspended to the cantilevers is made to correspond to the frequency of the external torsional force, whereby an effect of absorbing the torsional vibrations is realized. A controller is used for controlling the position of the masses responsive to the rotation speed of the shaft.

As described above, Embodiment 1 is based on the principle that the characteristic frequency of torsional vibration of the masses is varied by affecting the relative position of the masses with respect to the length of the respective cantilever supporting the masses by utilizing a centrifugal force to absorb the torsional vibrations.

Figure 1:
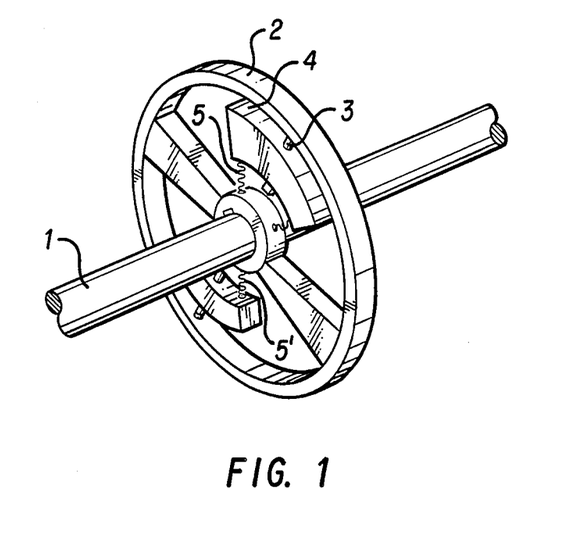
FIGS. 1 to 3 illustrate Embodiment 1 of the present invention.
Figure 2:
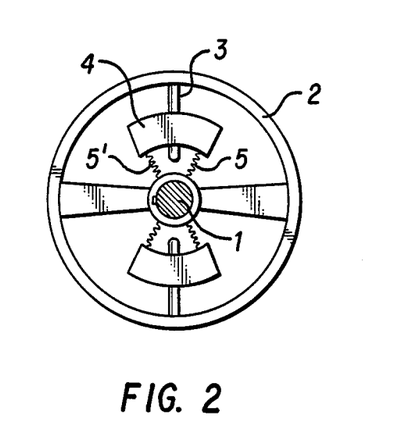

Embodiment 1 will now be described with reference to FIGS. 1–3. A circular wheel 2 is concentrically disposed with respect to a rotation shaft 1. A pair of beam springs 3 are fixedly secured on the inner shell of circular wheel 2, each disposed facing the other. A pair of masses 4 are radially movably secured to respective beam springs 3, while the inner side of masses 4 are elastically secured by a pair of respective guide springs 5, and 5'.

Figure 3:
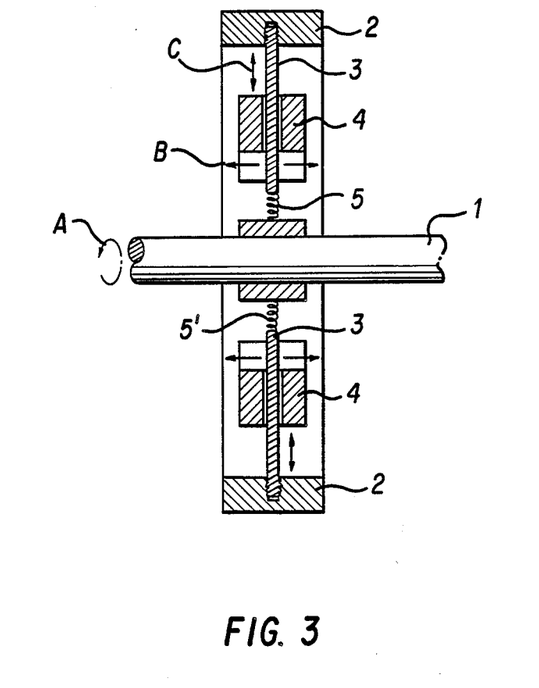

When rotation shaft 1 is rotated in a direction A as shown in FIG. 3, masses 4 vibrate in a direction B to absorb a torsional vibration of shaft 1. To realize such effect, masses 4 are moved along respective beam springs 3 toward and away from guide springs 5 and 5' in a direction C until the frequency of masses 4 is equal to the frequency of shaft 1.

In other words, masses 4 receives a centrifugal force due to the rotation of shaft 1 on one end and an elastic force from guide springs 5 and 5' on another end, causing masses 4 move in a self-adjusting manner. Thus an equilibrium in the position of masses 4 is obtained between guide springs 5 and 5' and beam springs 3, and thereby the torsional vibration of shaft 1 is effectively absorbed. The device of Embodiment 1 can be constructed economically because an expensive damper is not needed.

EMBODIMENT 2

In Embodiment 2, the frequency of a vibration motive force and the frequency of masses of an absorber are equalized, thereby forming a variable dynamic vibration absorber, to dissipate or absorb the vibration motive force.

Figure 4:
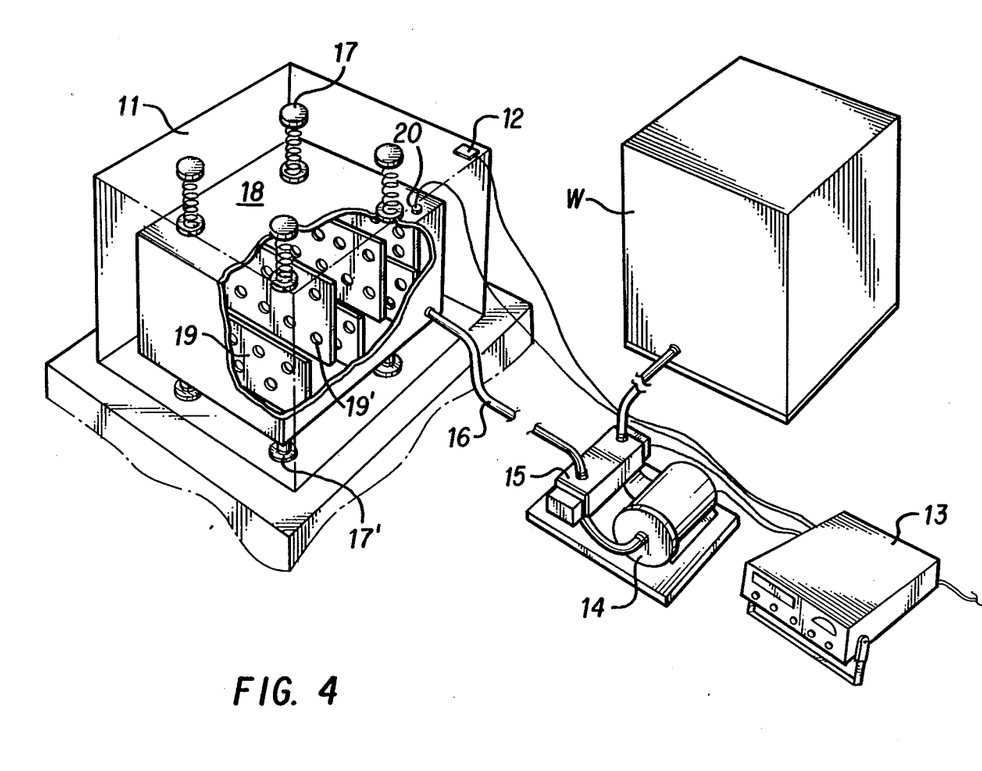
FIGS. 4 to 6 illustrate Embodiment 2 of the present invention.
Figure 5:
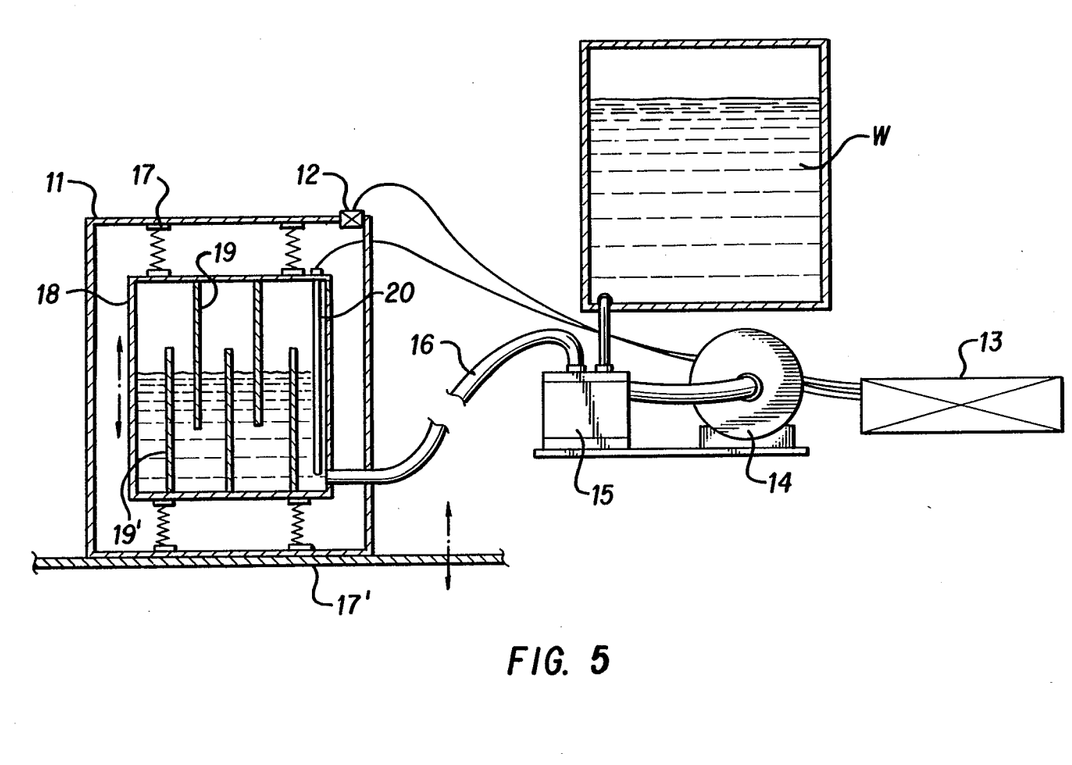
Figure 6:
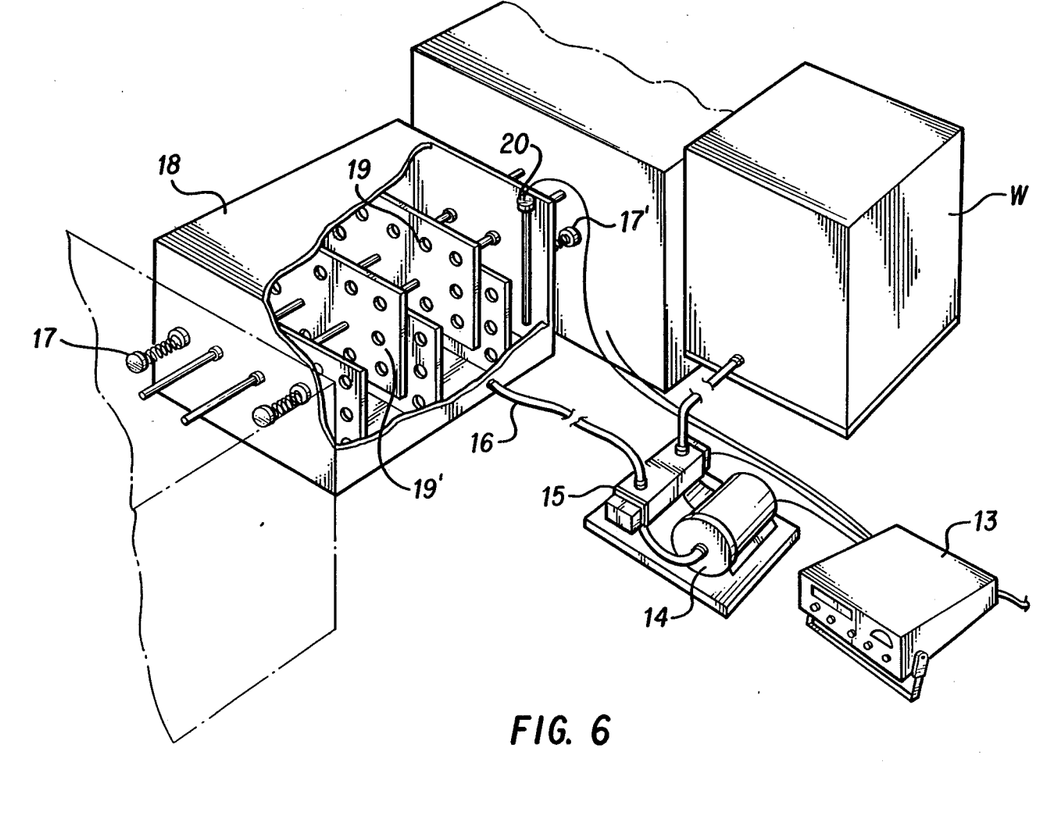

In FIGS. 4–6, a casing 11 is attached to a vibrating object. Casing 11 includes a vibration sensor 12 which is connected to a controller 13 which is in turn connected to a pump 14 and a solenoid valve 15. A separate water tank W is provided. A hose 16 is coupled to water tank W through solenoid valve 15 on one end and to a water tank type mass 18 on another end. Water tank type mass 18 is suspended by upper and lower springs 17 and 17', and includes separating plates 19 and 19' and a water level sensor 20.

The device of Embodiment 2 operates as follows. A vibration of the vibrating object is transmitted to casing 11 and sensor 12 senses the vibration. The sensed vibration is sent to controller 13 which in response provides computed data to drive pump 14. The water level of water tank type mass 18 is detected by water level sensor 20.

Responsive to the detected water level, solenoid valve 15 either delivers water to water tank type mass 18 or discharges water therefrom to water tank W. Thus, the weight of water tank type mass 18 is varied to provide a variation to the vibration frequency thereof. Separating plates 19 and 19' impedes turbulent oscillation of water.

EMBODIMENT 3

Figure 7:
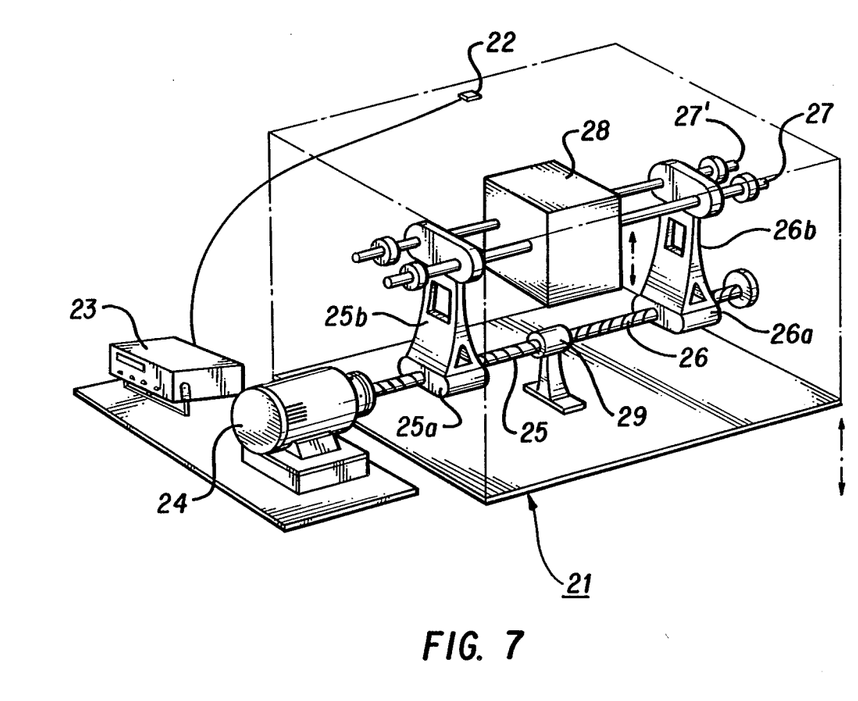
FIGS. 7 to 9 illustrate Embodiment 3 of the present invention.
Figure 8:
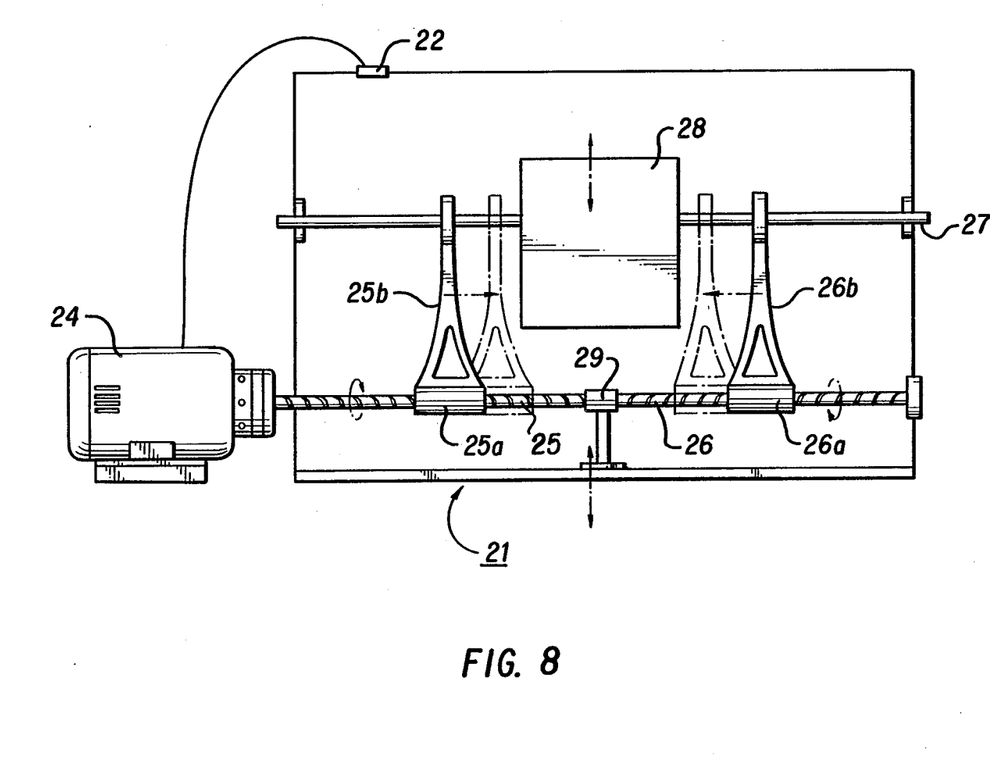
Figure 9:
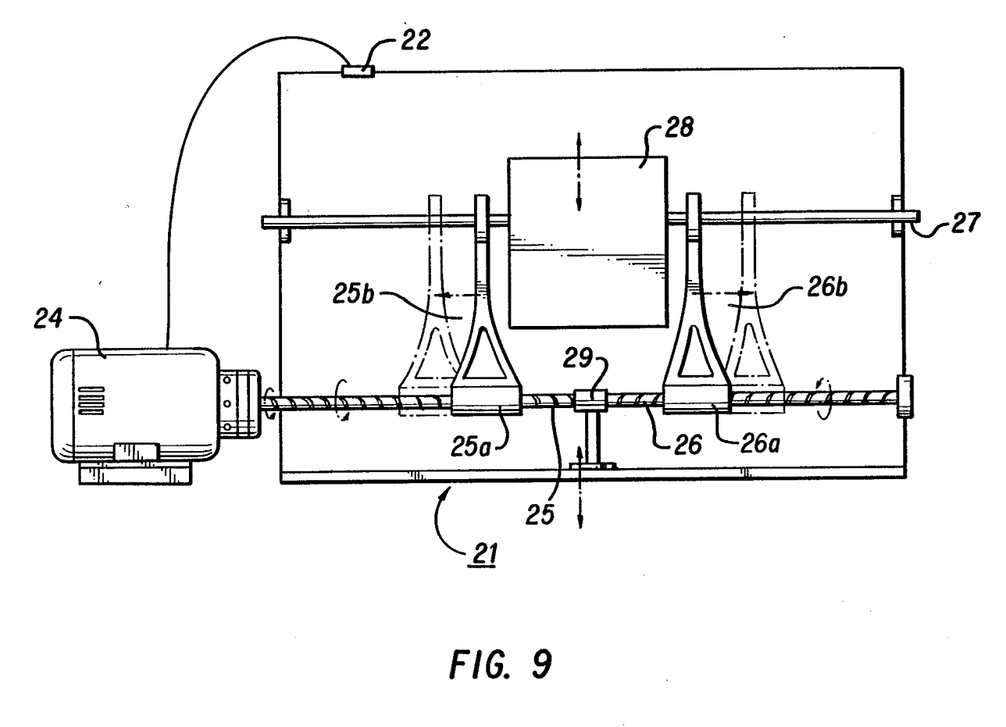

In FIGS. 7–9, the effective length of bar springs 27 and 27' is adjusted to equalize the frequency of the vibrating body with the frequency of mass 28 to provide a vibration absorbing effect. A casing 21 is attached to a vibrating body (not shown), and includes a vibration sensor 22 for activating a step motor 24 through a controller 23.

The shaft of step motor 24 is connected to a forward screw 25 which is in turn connected to a reverse screw 26. Forward and reverse screws 25 and 26 are respectively supported by supporting bases 25a and 26a. Supporters 25b and 26b are respectively formed extending upwardly from supporting bases 25a and 26a, for retaining a pair of bar springs 27 and 27'. Mass 28 is coupled to two bar springs 27 and 27' intermediate supporters 25b and 26b. An intermediate supporter 29 is provided for forward and reverse screws 25 and 26, for ultimately supporting mass 28.

The device of Embodiment 3 operates as follows. A vibration of the vibrating body is transmitted to casing 21 and is detected by vibration sensor 22. Data corresponding to the detection is sent to controller 23 which computes the detected data for ultimately activating step motor 24 in forward and reverse directions. The activation of step motor 24 causes forward and reverse screws 25 and 26 to rotate. The rotation of these screws in turn causes supporting bases 25a and 26a to either move toward each other as shown in FIG. 8, or away from each other as shown in FIG. 9. As a result, the effective length of bar springs 27 and 27' which support mass 28 are varied, thereby varying the vibrating frequency of mass 28.

EMBODIMENT 4

The device of Embodiment 4 is applicable to the case where axial vibrations become problematic. Embodiment 4 is based on the operational principle of Embodiment 2 in that the water level within the water tank type mass is varied for varying the characteristic frequency of the vibration absorber to obtain a vibration absorbing effect. Further, the flow of water from the water tank type mass is automatically regulated by water pressure arising from the rotation of the water.

In Embodiment 4, a water container has a rubber tube disposed therein and is made to rotate when filled with water. The water pressure is varied according to the rotation speed. Further, a second water container of same kind is disposed adjacent a first water container. The first and second containers are coupled to one another to communicate with one another, whereby water flows from a container having a higher water pressure to another having a lower water pressure, thereby automatically regulating mass distribution.

Conventionally, an axial damper has been used in cases where axial vibrations become problematic. However, since this provides only a damping effect, regulation and maintenance are difficult, and the cost is very high.

Embodiment 4 of the present invention effectively absorbs axial vibrations with a simple arrangement of structure. Embodiment 4 will now be described with reference to FIGS. 10 to 13.

Figure 11:
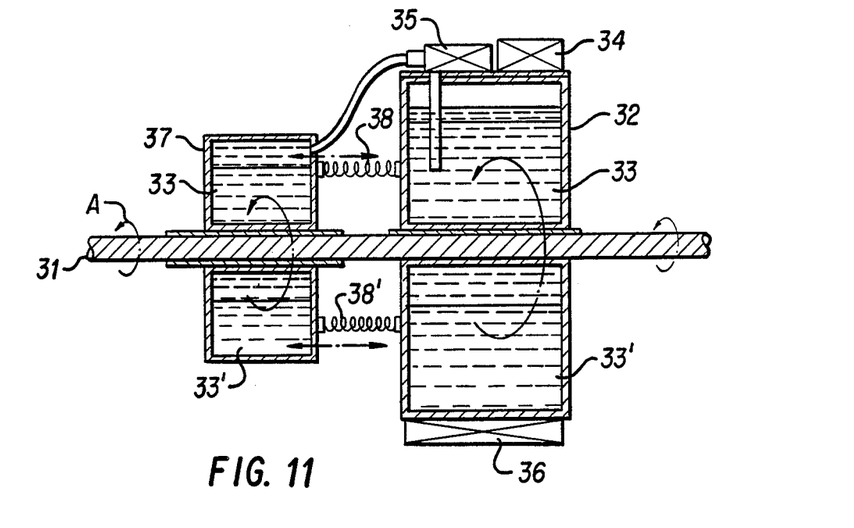

A cylindrical water tank 32 is disposed concentrically with respect to a shaft 31 which rotates in a direction A as shown in FIG. 11. The interior of cylindrical water tank 32 has separating plates 33 and 33'. A controller 34 and a pump 35 are attached at a position on a circumferential surface of cylindrical water tank. A weight 36 is attached at a position opposite controller 34 and pump 35.

Figure 10:
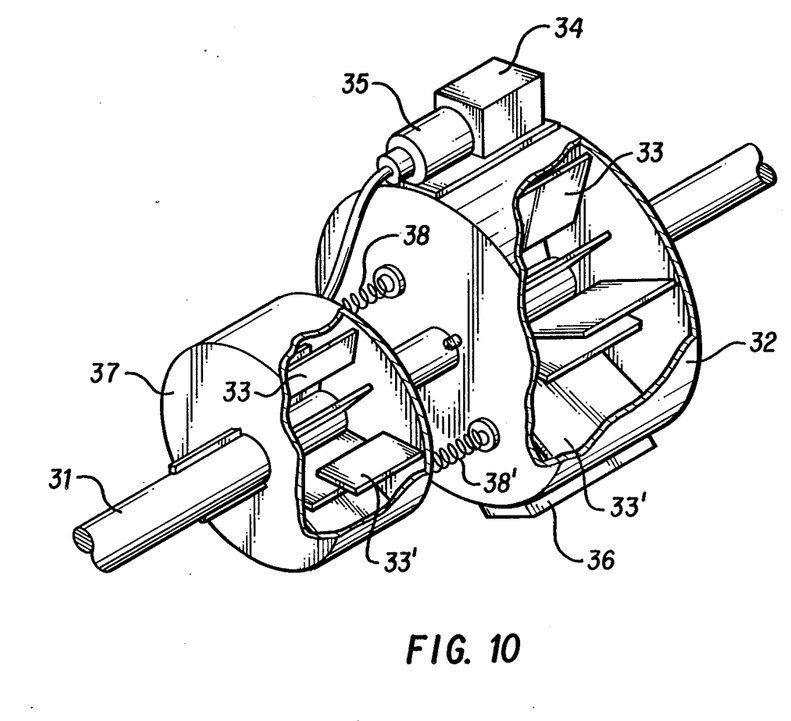
FIGS. 10 to 13 illustrate Embodiment 4 of the present invention.
Figure 12:
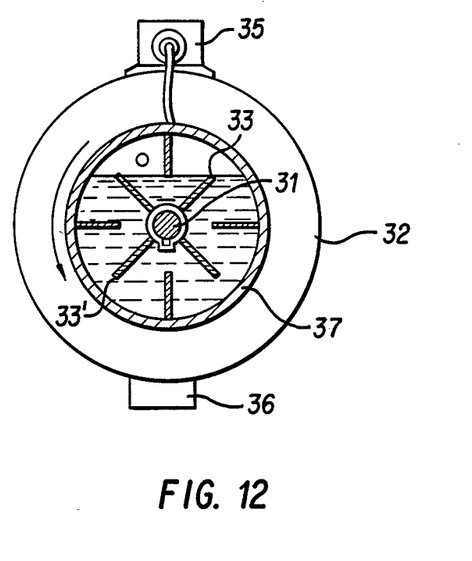

Mass tank 37 is concentrically disposed to shaft 31 adjacent cylindrical water tank 32. Mass tank 37 is fixedly mounted on shaft 1 in rotating direction A and is slidable in the axial direction at shaft 31. Cylindrical water tank 32 and mass tank 37 are elastically connected by springs 38 and 38'. Pump 35 is coupled to water tank 32 on one end and to mass tank 37 on another end. Mass tank 37 may have separating plates 33 and 33' without pump 35 and controller 34, so that water can directly flow from water tank 32 to mass tank 37.

According to Embodiment 4, when revolving shaft 31 generates axial vibrations, mass tank 37, which is slidable in an axial direction of shaft 31, responds to the axial vibration of shaft 31 by compressing or extending springs 38 and 38', thereby absorbing the axial vibration of shaft 31. Depending on the frequency of the axial vibration, controller 34 effects discharging water from water tank 32 to mass tank 37, and vice versa, varying masses at opposite sides of springs 38 and 38' and ultimately providing a variation to the frequency of mass tank 37. In FIG. 11, horizontal arrows adjacent respective springs 38 and 38' show the direction of compressing and extending respective springs 38 and 38' by mass tank 37.

In other words, the mass of water tank 32 and mass tank 37 is regulated whereby the frequency of vibration of mass tank 37 is equal to the frequency of the vibrating body, thereby absorbing vibration of the vibrating body by this equalized reacting vibration. Separating plates 33 and 33' impedes abrupt oscillations of water in the tank. Weight 36 has a same mass as controller 34 and pump 35 combined to provide a symmetry of mass for water tank 32 when rotated.

Figure 13:
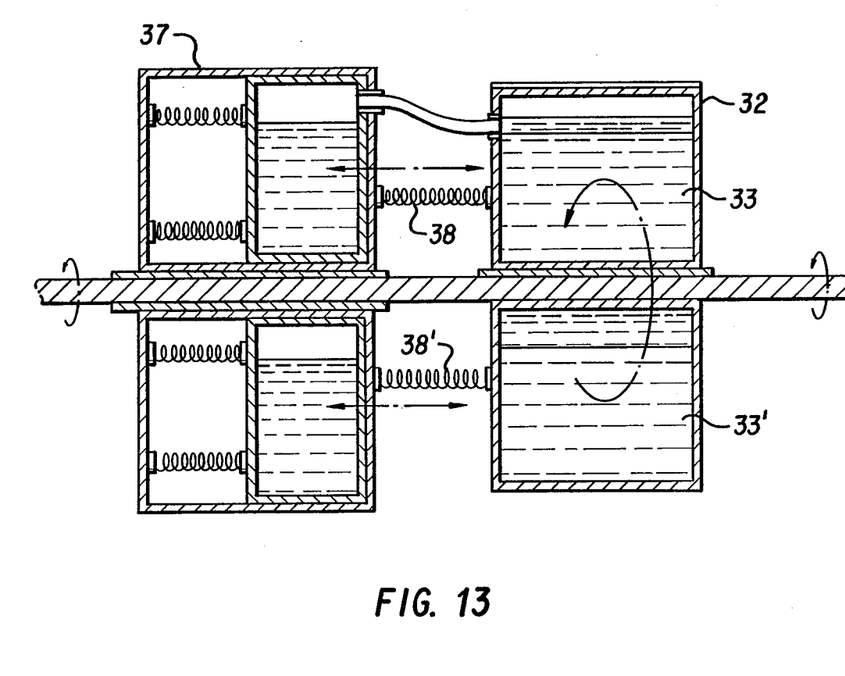

Further, as shown in FIG. 13, if a direct flow of water is provided between water tank 32 and mass tank 37, the water pressure in each tank is varied according to the rotation speed of the tank. Therefore, water will flow from the tank having a higher water pressure to the tank having a lower water pressure, thereby self-regulating the mass of mass tank 37.

EMBODIMENT 5

In Embodiment 5, the frequency of vibration from a vibration source such as an internal combustion engine, or an electric motor, as mentioned in Embodiment 1 is first measured, and then, springs of a variable dynamic vibration absorber are adjusted to the measured frequency, so that the characteristic frequency of the variable dynamic vibration absorber is equal to the frequency of vibration from an external force, thereby effecting absorbing of a vibration response.

The device of Embodiment 5 now be described as to its detailed structure with reference to FIGS. 14 and 15.

Figure 14:
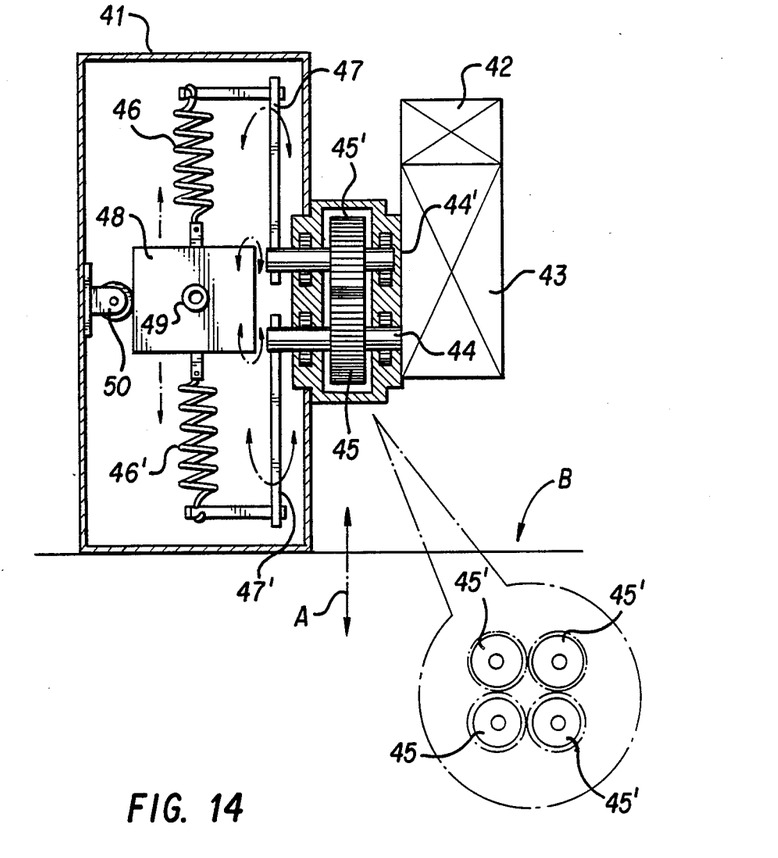
FIGS. 14 to 15 illustrate Embodiment 5 of the present invention.
Figure 15:
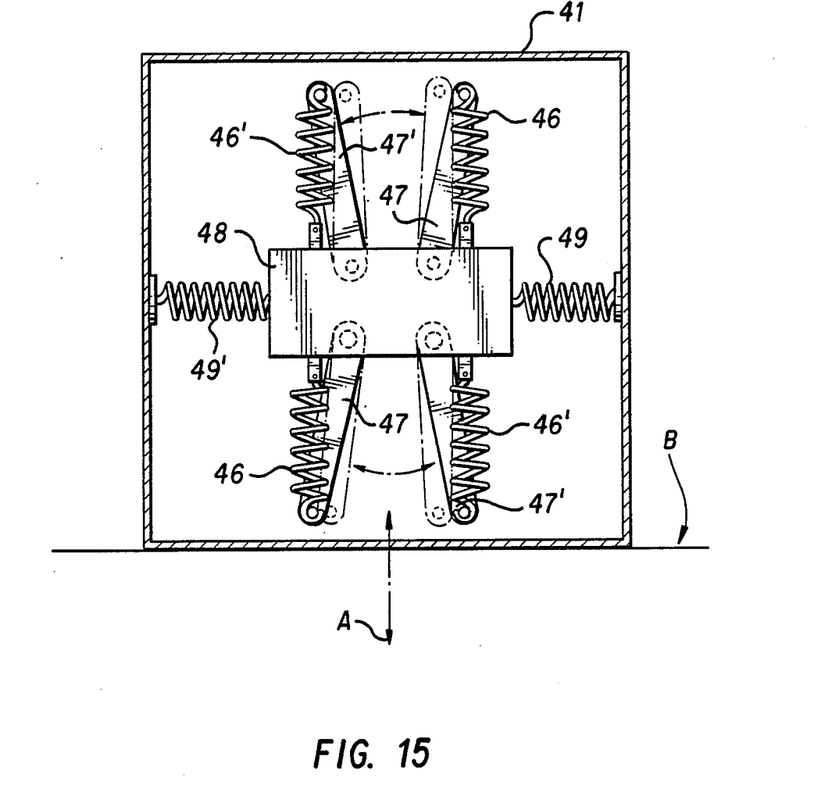

In FIG. 14, a casing 41 is attached to a vibrating body B which vibrates in a direction A. A controller 42 and a step motor 43 are disposed on a same side of casing 41. A gear 45 is installed to shaft 44 of step motor 43, and three other gears 45' are meshed to gear 45 by respective shafts 44'.

Supporting rods 47 and 47' for respective springs 46 and 46' are secured to an end of respective shafts 44 and 44' and mass 48 is secured to inner ends of springs 46 and 46'. Further, coil springs 49 and 49' are elastically disposed between opposite side walls of casing 41 and opposite side walls of mass 48 respectively. A roller 50 is provided for guiding mass 48 when mass 48 vibrates up and down.

The device of Embodiment 5 operates as follows. Controller 42 computes the frequency and the amplitude of a vibration transmitted to casing from vibrating body B vibrating in direction A. Responsive to the computed frequency and amplitude, controller 42 activates step motor 43. The activated step motor 43 effects rotating shaft 44 either in forward and reverse directions.

When shaft 44 is rotated to drive gear 45, supporting rods 47 and 47' turn in a forward or backward direction, corresponding to the rotational direction of shaft 44. Then, opposite ends of supporting rods 47 and 47' are pivoted forwardly or backwardly, and accordingly, springs 46 and 46' which are respectively connected to supporting rods 47 and 47' and mass 48 are given deflections and moved in a direction A as shown in FIG. 15, thereby giving a variation to the vibrating frequency of mass 48.

Further, in Embodiment 5, coil springs 49 and 49' are deposed between opposite side walls of casing 41 and opposite side walls of mass 48 to prevent sudden vibrations of mass 48 and to assure smooth movements of mass 48.

In the device of Embodiment 5, a variable dynamic vibration absorber is attached to a vibrating body. Elements of a vibration arising from the vibrating body are detected and fed to a controller as a signal. A computing circuit in the controller provides a characteristic frequency to the variable dynamic vibration absorber, which corresponds to the detected vibration elements.

In the device of Embodiments 1-5, the variable dynamic vibration absorber operates on a principle that an excessive vibration response due to a forced vibration source is absorbed by utilizing a free vibration. In conventional vibration absorbers, absorption of vibration is possible only for a predetermined frequency. In contrast, the dynamic vibration absorber of the present invention is adaptable to different varying frequencies of external forces by varying its own characteristic frequency. Therefore the device of the present invention is effective under any condition of external forces in absorbing vibrations.

In other words, the dynamic vibration absorber of the present invention is capable of detecting a range of vibration frequencies of external forces, and equalizing the characteristic frequency of the absorber to the frequency of the external force by a controller, thereby effecting a continuous absorbing of vibrations.

Further, the variable dynamic vibration absorber of the present invention does not require any external power except a small amount of direct current required for a stepping motor. This small direct current can be provided by a small storage battery. Therefore, the overall power consumption of the device of the present invention is very small.

Further, the variable dynamic vibration absorber of the present invention can be effectively applied to a vibrating body to absorb vibrations in any fastidious difficult situation where external forces are wildly fluctuated, thus providing an effective solution to the vibration problem.

We claim:

1. An automatically controlled variable heavy duty dynamic vibration absorber for a vibrating body, comprising: a casing for attachment to the vibrating body; a vibration sensor mounted to the casing; a controller connected to the vibration sensor; a step motor having a rotatable shaft activated by the controller; forward and reverse revolution screws fixedly coupled to the shaft of the step motor; supporting bases each rotatably retaining a respective one of the forward and reverse revolution screws; supporters spaced from one another and extended from respective supporting bases; bar springs slidably mounted to the supporters; and a mass supported by the bar springs intermediate the supporters.

2. An automatically controlled variable heavy duty dynamic vibration absorber from a vibrating body, comprising: a casing having opposing sides for attachment to the vibrating body; a controller mounted to the casing, the step motor having a rotatable shaft; a plurality of gears mounted to rotate with the shaft of the step motor; supporting rods having first and second opposite ends, the first ends mounted adjacent the gears to rotate the supporting rods with the gears; first spring means coupled adjacent the second end of a respective one of the supporting rods; a mass having opposing side walls elastically coupled to the first spring means; and second spring means coupling the opposing side walls of the mass to respective opposing side walls of the casing.

* * * * *